United States Patent [19]
Andreev et al.

[11] 3,821,749
[45] June 28, 1974

[54] LIGHT-BEAM OSCILLOGRAPH

[76] Inventors: Oleg Semenovich Andreev, ul. Tolbukhina 22, kv. 5; Boris Konstantinovich Birjukov, ul. Dimo, 14, kv. 45; Yury Mikhailovich Byzov, ul. Dmitrova, 16, kv. 120; Moisei Abramovich Lekhtman, ul. Pugacheva, 53, kv. 60; Azik Iosifovich Perelberg, ul. Pushkina, 16, kv. 12; Semen Itskhovich Strimbling, ul. Benderskaya, 55, kv. 14; Boris Sergeevich Trachevsky, ul. Roz, 31/2, kv. 11; Isak Berovich Fikhman, ul. Pirogova, 44, kv. 17; Pavel Andreevich Cherepakha, per. Zerkalny, 7; Tamara Yakovlevna Shraifeld, ul. Florilor, 8/4, kv. 40, all of Kishinev, U.S.S.R.

[22] Filed: Sept. 21, 1973

[21] Appl. No.: 399,441

Related U.S. Application Data
[63] Continuation-in-part of Ser. No. 300,312, Oct. 24, 1972, abandoned, which is a continuation of Ser. No. 92,403, Nov. 24, 1970, abandoned.

[52] U.S. Cl................. 346/109, 235/197, 324/97, 324/140 R
[51] Int. Cl.............................................. G01d 5/12
[58] Field of Search.......... 346/109; 324/97, 140 R, 324/140 D; 235/197, 196, 195, 194

[56]          References Cited
              UNITED STATES PATENTS

| | | | |
|---|---|---|---|
| 2,167,124 | 7/1939 | Minton | 346/33 C X |
| 2,253,358 | 8/1941 | Williams | 324/140 R X |
| 2,267,356 | 12/1941 | Ritzmann | 346/29 X |
| 2,294,320 | 8/1942 | Ritzmann | 346/29 X |
| 2,304,740 | 12/1942 | Minton | 235/197 X |
| 2,365,218 | 12/1944 | Rogers | 324/140 R X |
| 3,121,788 | 2/1964 | Hilbinger | 235/194 |

*Primary Examiner*—Joseph W. Hartary
*Attorney, Agent, or Firm*—Holman & Stern

[57]          ABSTRACT

A light-beam oscillograph having a magnetic block the sockets of which incorporate oscillograph galvanometers and at least one galvanometer-transducer having a mirror output directly coupled to an optical system and a chart drive means wherein an information recording medium records the result of transformation of at least one signal being investigated.

1 Claim, 6 Drawing Figures

LIGHT-BEAM OSCILLOGRAPH

This application is a continuation-in-part of our pending application Ser. No. 300,312 filed Oct. 24, 1972 now abandoned which in turn is a continuation of Ser. No. 92,403 filed Nov. 24, 1970, now abandoned.

This invention relates to instrumentation, and more specifically, to instruments for observation and recording of electrical and other signals transduced into electrical, in particular, to light-beam oscillographs.

Commonly known in the art are light-beam oscillographs manufactured by "HONEYWELL," "HARTMAN BROWN" and "SIEMENS." The structure and principle of operation of these instruments were described in book "Light-Beam oscillographs" by W. Hertel et al. (Oldenburg Publisher, Munich, 1961).

The main unit of such light-beam oscillographs is an oscillograph-galvanometer inserted in a socket of a magnetic block. When an electrical signal being investigated is applied to the oscillograph galvanometer, this signal is recorded as a time function in the form of the deflection of a light beam obtained by means of a mirror of the oscillograph galvanometer, and focused by an optical system.

During the time of their existence, the light-beam oscillographs were greatly improved, in particular, first the information was recorded onto a photographic paper with subsequent development thereof; then direct visual recording of the signals became possible through the use of an ultraviolet recording. Besides, the speed of recording was being greatly increased, and so forth. The oscillograph galvanometers themselves underwent a number of modifications, for example, the natural oscillation frequency of the oscillograph galvanometer, was increased and its sensitivity improved, and so on. Also known in the art are light-beam oscillographs wherein one galvanometer records several imput electircal signals, such as disclosed in U.S.A. Pat. No. 2,167,124, wherein each of the signals investigated is recorded separately or together with other signals. In the latter case, the recording is effected by an adder means and represents an electrical summing-up of the signals from two or more sensors, followed by applying the resultant signal to the input of the oscillograph galvanometer.

Known in the prior art is also an apparatus disclosed in U.S.A. Pat. No. 2,267,356, wherein a multichannel oscillographic recording of the signals investigaged is effected by oscillograph galvanometers, a distinguishing feature of this apparatus consisting in that the oscillograph galvanometers are so oriented in the magnetic block of the oscillograph itself that a light beam reflected from the mirror of one oscillograph galvanometer is directed to the mirror of the other oscillograph galvanometer. Therefore, the signal from the mirror of the second oscillograph galvanometer, which is recorded on a recording medium, represents the sum of two signals (of the first and second galvanometers).

Thus, in both patents several signals are converted, however the number of conversion modes is limited.

A disadvantage of all prior art light-beam oscillographs consists in that their sensitive elements, i.e. oscillograph galvanometers, are capable of graphically representing on a recording medium the time variants of only one electrical signal applied to the input of an oscillograph galvanometer. Because of this, one has ad-ditionally to process the records obtained by each oscillograph galvanometer in order to ascertain the process as a whole.

The object of the present invention is to provide a light-beam oscillograph wherein its sensitive elements would permit, for example, two electrical signals to be applied onto the input thereof, mathematical operations to be carried out with these signals, followed by a graphical representation of their resultant interrelation on a recording medium.

This and other objects are achieved in a light-beam oscillograph using oscillograph galvanometers incorporated in the sockets of a magnetic block, whose mirrors are connected through an optical system to a recording medium whereon recorded are signals applied to the input of a measuring loop of the galvanometer, provided, according to the invention, with at least one galvanometer transducer whose design is similar to that of the oscillograph galvanometer but the measuring loop thereof carries an element rigidly affixed thereto, which element is sensitive to the variations of magnetic field, for example a Hall generator.

Having mounted in the magnetic block of the oscillograph several galvanometer transducers, each performing a definite mathematical operation, it is possible, by coupling thereof in an adequate manner and connecting the final galvanometer transducer to the input of the oscillograph galvanometer, to solve a complicated functional dependence of several signals of interest while the curve recorded by means of said galvanometer transducer will be a graphical representation of the solution of the complicated functional dependence.

The invention will be best understood from the following description of an examplary embodiment thereof taken in conjunction with the accompanying drawings, wherein.

Figure 1:
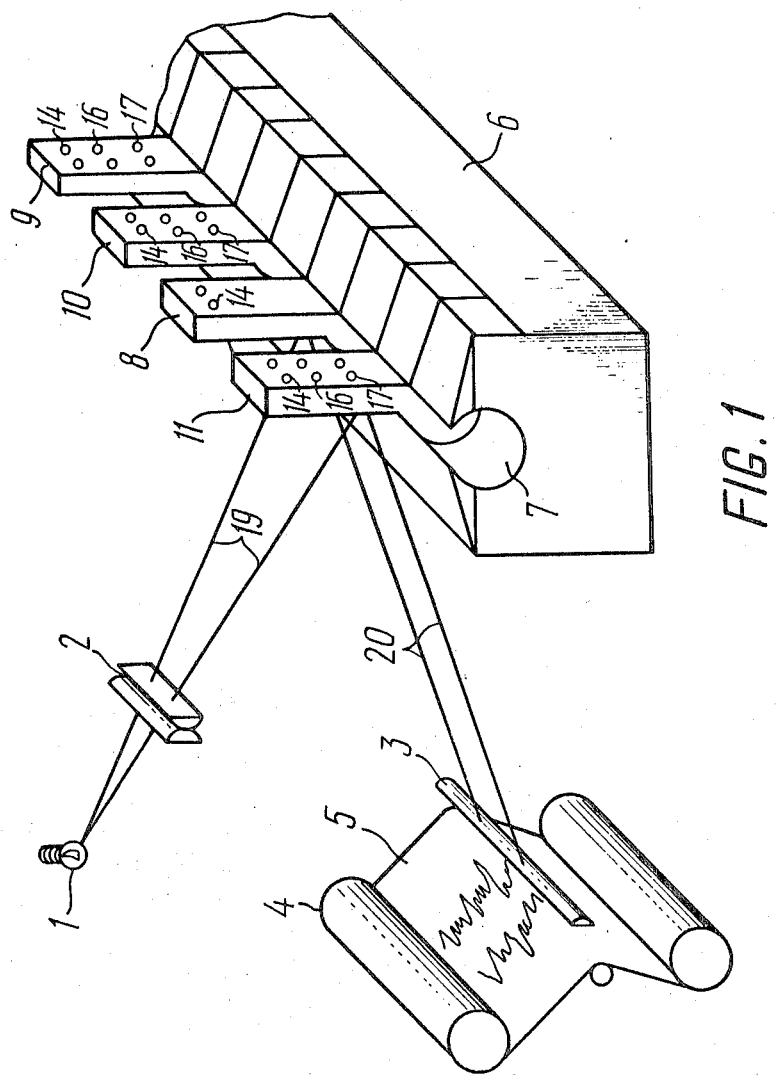
FIG. 1 shows schematically a light-beam oscillograph according to the invention, using galvanometer transducers.

Referring now to the Figures, the light-beam oscillograph comprises a light source 1 (FIG. 1), lenses 2 and 3, a chart drive means 4 feeding a recording medium 5, a magnetic block 6 having sockets 7 which incorporate oscillograph galvanometers 8 and galvanometer function generating transducers 9, 10 and 11.

Figure 2:
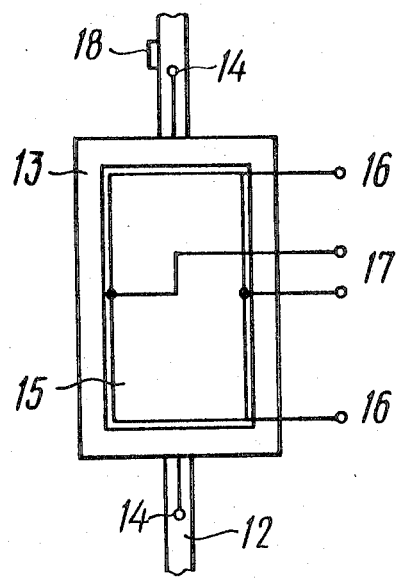
FIG. 2 shows schematically a galvanometer transducer according to the invention.

The galvanometer function generating transducers 9, 10 and 11 (FIG. 1) include a measuring loop 13 suspended on a tension member 12 (FIG. 2) and having input terminals 14 and a Hall generator 15 rigidly secured to the measuring loop 13. The Hall generator is provided with input terminals 16 and output terminals 17. The tension member 12 also bears a mirror 18 which is an additional mirror output thereof.

As follows from the above, the galvanometer function generating transducers 9, 10 and 11 are devices which are constructed similarly to the conventional oscillograph galvanometer 8 and differ therefrom only by an element sensitive to variations of magnetic field produced by the magnetic block 6, said element being rigidly attached to the measuring loop 13. In the given case, this element is a Hall generator 15. Owing to the introduction of this element, the galvanometer transducer is provided with a pair of the additional terminals 16 and 17 while the conventional oscillograph galvanometer has only one pair of the terminals 14 to be connected to the source of signal being investigated (not shown in the Figures).

In a conventional oscillograph galvanometer, the output signal is a light beam reflected by the mirror of the oscillograph galvanometer. A galvanometer transducer provides an output signal in electric form (together with the light beam), thereby enabling further processing thereof.

Figure 3:
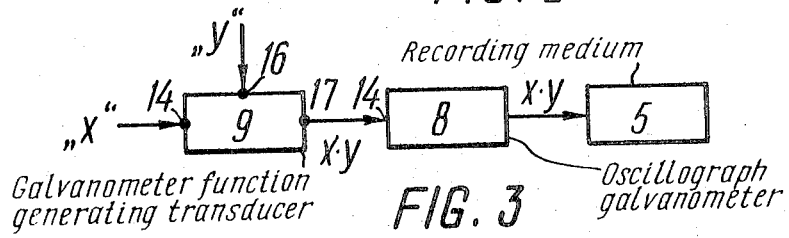
FIG. 3 is a block diagram of a light-beam oscillograph according to the invention, having a galvanometer transducer which performs the operation of multiplication.

Consider one of the modes of operation of the light-beam oscillograph when two signals, for example "x" and "y," proportional to currents $I_1$ and $I_2$, respectively, are applied to be multiplied to the inputs 14 and 16 (FIGS. 1 and 3) of the galvanometer transducer 9 mounted in the magnetic block 6.

It should be pointed out that the Hall generator 15 (FIG. 2) is oriented so that its plane is parallel to the lines of magnetic force produced by the block 6.

When the current $I_1$ corresponding, say, to the signal "x" flows through the measuring loop 13 of the galvanometer transducer 9 (FIG. 1), the measuring loop 13 together with the Hall generator 15 is turned in the magnetic field through an angle $\alpha$ which is proportional to the current $I_1$. The magnetic flux crossing the plane of the Hall generator 15 and induction B will be:

$$B = B_0 \sin \alpha$$

Since the angle $\alpha$ of turn of the measuring loop 13 of the galvanometer transducer 9, as well as the angle of turn of the loop of a conventional oscillograph galvanometer, is small, it is possible to assume that $B = B_0 \alpha$.

Therefore, by applying to the input of the Hall generator 15 the current $I_2$ corresponding to the signal "y" delivered to the terminals 16, a Hall e.m.f. "E" appears across the output terminals of the Hall generator 15, said e.m.f. being proportional to the product of the current $I_2$ value by the induction B value, i.e. proportional to the product of the input electrical signals "x" and "y."

$$E = K \cdot B \cdot \alpha \cdot I_2 = K_1 \cdot B_0 \cdot I_1 \cdot I_2 \tag{1}$$

where
K is a constant dependent on the parameters of the Hall generator 15;
$K_1$ is a constant dependent on the parameters of the Hall generator 15 and the measuring loop 13.

The obtained e.m.f. "E" is proportional to the product of the signals "x" and "y" and is recorded in the manner as follows.

The input terminals 17 of the Hall generator 15 of the galvanometer transducer 9 are connected to the terminals 14 of the oscillograph galvanometer 8 (FIG. 1 and 3) and, illuminating the mirror (not shown in the Figures) of the latter by a light beam 19 passing through the lens 2 from the light source 1, the signal being investigated is recorded on the recording medium 5 by a reflected light beam 20 passing through the lens 3.

Figure 4:
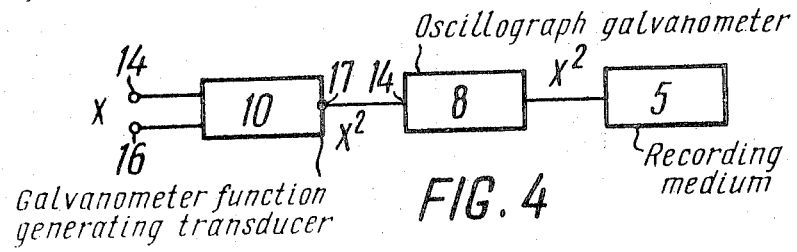
FIG. 4 is a block diagram of a light-beam oscillograph according to the invention, having a galvanometer transducer which performs the operation of squaring.

Consider another mode of operation of the light-beam oscillograph of this invention, wherein the galvanometer transducer 10 mounted in the magnetic block 6 (FIG. 1) performs the operation of squaring (FIG. 4).

In this case, one of the input terminals 14 (FIG. 2) of the measuring loop 13 is connected to one of the terminals 16 of the Hall generator 15. The investigated signal "x" to be squared is applied to the free terminals 14 and 16. Then the equal currents $I_1$ and $I_2$ caused by the same signal "x" being investigated flow through the measuring loop 13 and the Hall generator 15. As follows from the formula (1), an e.m.f. proportional to the square of the signal "x" appears across the output terminals 17 of the Hall generator 15. This signal is recorded in the same manner as described above for the case of operation of the light-beam oscillograph in the mode of recording the product of two electric signals.

Figure 5:
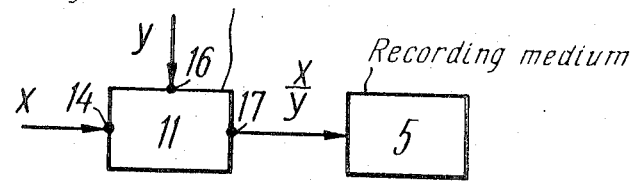
FIG. 5 is a block diagram of a light-beam oscillograph according to the invention, having a galvanometer transducer which performs the operation of division.

Consider still another mode of operation of the light-beam oscillograph of this invention, wherein two electric signals to be divided, for example "x" corresponding to the current $I_1$ and "y" corresponding to the current $I_2$, are applied to the terminals 14 and 16 (FIGS. 1 and 5) of the galvanometer transducer 11 mounted in the magnetic block 6. These signals are respectively applied to the terminals 14 of the measuring loop 13 and the terminal 16 of the Hall generator 15 of the galvanometer transducer 11.

The e.m.f. appearing accross the output terminals 17 of the Hall generator 15 is applied to the terminals 14 of the measuring loop 13 in such polarity that the current generated thereby is directed oppositely to the signal "x." The momental equation of the galvanometer transducer 11 in static conditions will be $$W\alpha + M_2 = M_1$$

where
$W\alpha$ is the counteracting momentum of the tension member 12;
$M_2$ is the momentum developed by current generated by Hall generator 15 e.m.f. during interaction thereof with the magnetic field of the magnetic block 6;
$M_1$ is the torque of the measuring loop 13, developed by the current $I_1$ corresponding to the signal "x" and interacting with the magnetic field of the magnetic block 6.
$\alpha$ is the obtained angle of turn of the measuring loop 13 and the Hall generator 15 rigidly attached thereto.

The torques $M_1$ and $M_2$ are related to the current $I_x$ generated by the e.m.f. of the Hall generator 15 and to the current $I_1$ through the following relations $$M_1 = \psi I_1$$
$$M_2 = \psi I_x$$

(3)

where $\psi$ is flux-linkage of the measuring loop 13.

The current $I_x$ is related to the current $I_2$ delivered to the input terminals 16 of the Hall generator 15 through the following relation $$I_x = (K_1/R) I_2 \alpha \qquad (4)$$

where $R$ is resistance of circuit: the measuring loop 13 - the Hall generator 15.

Taking into account (3) and (4), the equation (2) may be rewritten $$W\alpha + \psi K_1 \cdot I_2 \cdot \alpha/R = \psi I_1 \qquad (5)$$

In case the value of the counteracting momentum of the tension members 12 meets the inequality $W<<(\psi K_1/R) I_2$, then, as follows from the formula (5), the angle $\alpha$ will be proportional to the relation of the currents $I_1$ and $I_2$:

$$\alpha = R/K_1 \cdot I_1/I_2 \qquad (6)$$

i.e. the mirror 18 of the galvanometer transducer 11 records on the recording medium 5 a value which is proportional to the relation of the input signals "$x$" and "$y$," therefore the electrical signal taken from the terminals 17 is also proportional to the relation of the signals "$x$" and "$y$."

Figure 6:
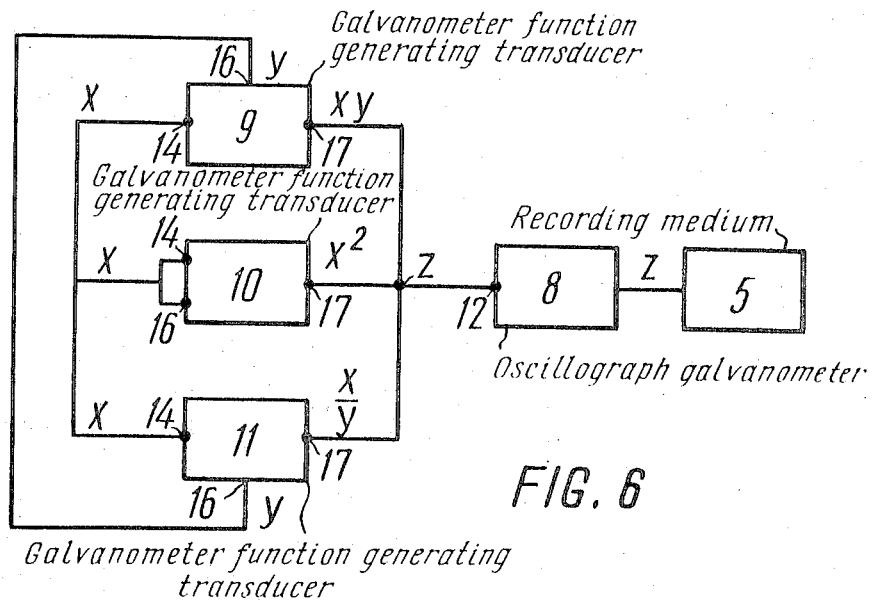
FIG. 6 is a block diagram of a light-beam oscillograph according to the invention, having galvanometer transducers which simultaneously perform several operations.

Consider yet another mode of operation of the light-beam oscillograph of this invention, whereby the signal "$x$" is applied to the joint inputs 14 (FIG. 6) of the galvanometer transducers 9 and 11 and to the inputs 14, 16 of the galvanometer transducer 10, while the signal "$y$" is applied to the joint inputs 16 of the galvanometer transducers 9 and 11.

According to the above-considered, signals appear accross the output terminals 17 of the galvanometer transducers 9, 10 and 11, which are proportional to the following values: the product of "$x$" and "$y$," on the galvanometer transducer 9; "$x^2$," on the galvanometer transducer 10; and the relation "$x$"/"$y$", on the galvanometer transducer 11.

The output terminals 17 of the galvanometer transducers 9, 10 and 11 are connected to the input terminals 14 of the oscillograph galvanometer 8 whose measuring loop 13 turns in this case over a certain total angle $\alpha^z$ which is proportional to a value Z equal to "$x \cdot y + x^2 + x/y$."

Thus the mirror thereof (not shown in the Figures) records on the information recording medium 5 a value which is proportional to said value Z.

Thus, the light-beam oscillograph disclosed herein can record not only individual variables of a process being investigated, but also mathematically transform them and record the results of their relationships. The results of this mathematical transformation, recorded on a recording medium, enable a visual evaluation of the process as a whole to be made.

Moreover, the labour-consuming decoding of oscillograms is minimized or completely eliminated.

The signals thus mathematically transformed can be fed directly into a computer, thereby cutting down the amount of information introduced into the computer.

What we claim is:

1. A light-beam oscillograph comprising:
a light-source, an optical system, a magnetic block with a row of sockets in it; an oscillograph galvanometer set up in one of said sockets of said magnetic block; one galvanometer transducer set up in another socket of said magnetic block, said galvanometer transducer presenting the results of a mathematical conversion in electrical form which is coupled to said oscillograph galvanometer for recording these results said galvanometer transducer also presenting the results of said mathematical conversion in the form of deflection of the beam of light; and a drive mechanism with a recording medium upon which the results of said conversion are recorded either directly from said galvanometer transducer or from said oscillograph galvanometer.

* * * * *